J. M. RUSBY.
MANUFACTURE OF GAS.
APPLICATION FILED DEC. 10, 1909.

1,172,226.

Patented Feb. 15, 1916.

WITNESSES:
Rob't R. Kitchel
Frank E. French

INVENTOR
John M. Rusby
BY
Augustus B. Stoughton
ATTORNEY

UNITED STATES PATENT OFFICE.

JOHN M. RUSBY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

MANUFACTURE OF GAS.

1,172,226.  Specification of Letters Patent.  Patented Feb. 15, 1916.

Application filed December 10, 1909. Serial No. 532,310.

*To all whom it may concern:*

Be it known that I, JOHN M. RUSBY, a citizen of the United States, residing at the city of Philadelphia, in the county of Philadelphia and State of Pennsylvania, have invented certain new and useful Improvements in the Manufacture of Gas, of which the following is a specification.

The principal object of the present invention is to provide simple, reliable and efficient means for introducing into a gas generator the quantity of air or steam or both, or in other words, gas making fluid or fluid ingredient, required for attaining uniform and economical conditions of operation, for avoiding waste and useless expenditure of materials, and for procuring a uniform and good quality of gas. To this end, according to this invention, use is made of a drop in pressure in the fluid feed pipes due to friction loss as the means by which the quantity of fluid introduced into the generator is regulated either manually or automatically.

Embodiments of the invention chosen for explanation are illustrated in the accompanying drawings in which—

Figure 1:
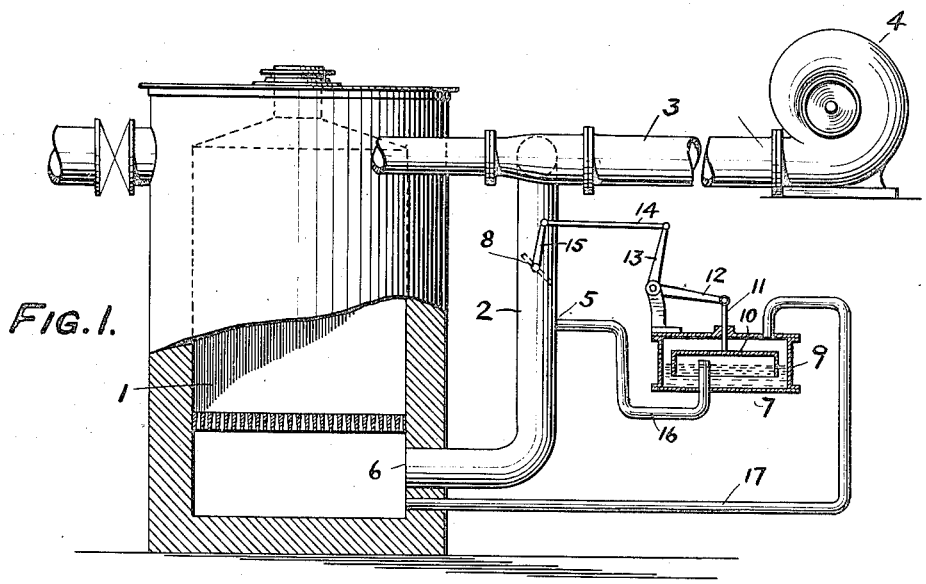
Figure 2:
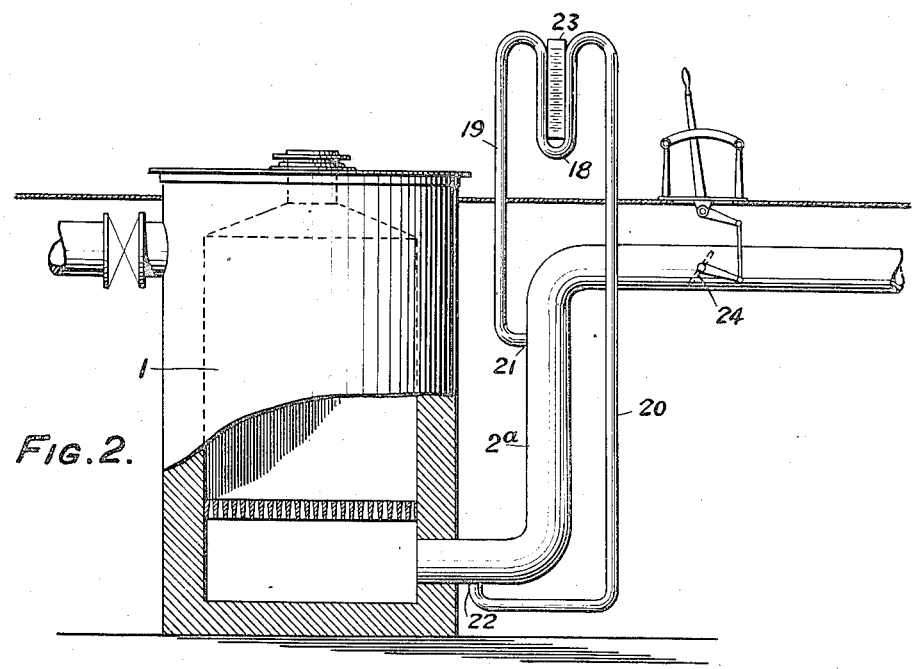

Figures 1 and 2, are elevational views with parts broken away illustrating the invention applied to the regulation of air, automatically in Fig. 1, and manually in Fig. 2.

In the drawings 1, is a gas generator and the type of generator illustrated is that which forms part of a water gas set and to which air and steam are alternately admitted. However, the invention is not limited to this type of generator and is applicable in whole or in part to other types of gas generators.

Referring to Fig. 1, 2 is the air pipe by which the air blast is supplied to the generator. This pipe 2, is connected with an air trunk 3, to which air is supplied as by means of the blower 4. In the feed pipe 2, there is a drop in pressure due to friction loss and in this, bends, contractions and the like play a part. For example, between the points 5 and 6, there is a drop in pressure due largely to friction loss and this drop is approximately proportional to the quantity of air traversing the pipe, the greater the quantity the greater the drop, and the less the quantity the less the drop. 7, is a device responsive to differences in pressure and adapted to open and close a valve damper or the like 8, in the feed pipe 2. The device 7, is shown to consist of a housing 9, containing fluid into which dips a movable bell 10. The stem 11, of the bell is connected with one arm 12, of a bell crank lever, the other arm 13, of which is connected by a link 14, with an arm 15, attached to the spindle of the damper 8. 16, is a pipe connection communicating with the interior of the bell and with the pipe 2, at say the point 5, and 17, is a pipe communicating with the interior of the housing 9, and with a point as 6, which is shown at the interior of the generator, but it may be at some point in the pipe 2, nearer to the generator than the point 5, as will be described in connection with Fig. 2. The parts of the device are adjusted and the section of supply pipe included between the points 5 and 6 is calibrated, so that in the normal position of the parts the appropriate or necessary quantity of air is admitted. The tendency to the admission of more or less than this appropriate quantity of air changes the difference in pressure between the points 5 and 6, thus causing the device 7, and its connections to automatically adjust the damper 8, so as to permit of the passage of the appropriate or necessary quantity of air.

As shown in Fig. 2, a U-tube 18, containing a suitable fluid in the depending part thereof has its respective ends connected by a pipe 19, and by a pipe 20, with two points 21 and 22, on the air supply pipe 2ª, between which there is a drop in pressure due to friction loss. A scale 23, and a manually actuated valve or damper 24, in the air supply pipe are provided. The parts are of course calibrated and by reference to the scale 23, and to the column of fluid in the U-tube 18, it is possible to manually manipulate the valve so as to keep the quantity of air supply constant and appropriate for the gas making process.

What I claim is:

1. The combination of a gas generator, a fluid feed pipe, and a regulating valve with a meter consisting of a portion of said feed pipe to one side of said valve and of such length that there is a drop of pressure in it due to friction loss, of two pipes connected with the opposite ends of said portion of said feed pipe and of means responsive to the differential pressure in the last mentioned pipes, substantially as described.

2. The combination of a gas generating apparatus and its fluid feed pipe, a meter consisting of a portion of said pipe of such length that there is a drop of pressure in it due to friction loss, a regulating valve to one side of said portion of the fluid feed pipe, means adapted to operate said valve, and two pipes connected with said means and with the ends of said portion of said fluid feed pipe, substantially as described.

In testimony whereof I have hereunto signed my name.

JOHN M. RUSBY.

Witnesses:
CLIFFORD K. CASSEL,
FRANK E. FRENCH.

Copies of this patent may be obtained for five cents each, by addressing the "Commissioner of Patents, Washington, D. C."